United States Patent [19]
Kawasaki et al.

[11] Patent Number: 5,292,845
[45] Date of Patent: Mar. 8, 1994

[54] ETHYLENE/ALPHA-OLEFIN/7-METHYL-1,6-OCTADIENE COPOLYMER RUBBER AND COMPOSITION OF THE SAME

[75] Inventors: Masaaki Kawasaki; Toshimasa Takata; Mitsuhiko Onda, all of Waki; Hidenari Nakahama; Kiyoshi Honma, both of Ichihara, all of Japan

[73] Assignee: Mitsui Petrochemical Industries, Ltd., Tokyo, Japan

[21] Appl. No.: 6,986

[22] Filed: Jan. 21, 1993

[30] Foreign Application Priority Data

Jan. 23, 1992 [JP] Japan ................. 4-010299
Oct. 14, 1992 [JP] Japan ................. 4-275870
Oct. 14, 1992 [JP] Japan ................. 4-275871

[51] Int. Cl.$^5$ ............... C08F 236/20; C08L 23/16
[52] U.S. Cl. ................. 526/336; 526/151; 526/160; 525/236; 525/237
[58] Field of Search ........... 526/336, 160, 151; 525/237, 236

[56] References Cited

U.S. PATENT DOCUMENTS

| | | | |
|---|---|---|---|
| 3,250,753 | 5/1966 | Kottenhahn | 526/336 X |
| 3,291,780 | 12/1966 | Gladding et al. | 526/336 X |
| 5,229,478 | 7/1993 | Floyd et al. | 526/336 X |

FOREIGN PATENT DOCUMENTS

0200351 5/1986 European Pat. Off. .
WO88/04674 6/1988 PCT Int'l Appl. .

OTHER PUBLICATIONS

Database WPIL Derwent Publications Ltd., London, GB; AN 92-255715 & JPA 4 173 815 (Mitsui Petrochemical Industries) Jun. 22, 1992.

*Primary Examiner*—Fred Teskin
*Attorney, Agent, or Firm*—Sherman and Shalloway

[57] ABSTRACT

The ethylene/α-olefin/7-methyl-1,6-octadiene copolymer rubber of the invention is a random copolymer rubber prepared using a Group IVB transition metal type catalyst containing a specific zirconium catalyst component, and in this copolymer rubber, a molar ratio of ethylene to α-olefin, a diene content, an intrinsic viscosity [η], an intensity ratio D of Tαβ to Tαα in a $^{13}$C-NMR spectrum of said copolymer rubber, a B value which is a measure of distribution of each monomer and a glass transition temperature are all within specific ranges. The rubber composition of the invention comprises the above-mentioned random copolymer rubber and a conjugated diene rubber. The random copolymer rubber has high stereoregularity, narrow composition distribution and excellent low-temperature flexibility, and shows extremely high covulcanizability with the conjugated diene rubber. In addition, this random copolymer rubber is excellent in weathering resistance, ozone resistance and thermal aging resistance.

12 Claims, 1 Drawing Sheet

Fig. 1

ETHYLENE/ALPHA-OLEFIN/7-METHYL-1,6-OCTADIENE COPOLYMER RUBBER AND COMPOSITION OF THE SAME

FIELD OF THE INVENTION

The present invention relates to an ethylene/α-olefin/7-methyl-1,6-octadiene copolymer rubber having a narrow composition distribution and excellent low-temperature flexibility. The present invention also relates to a composition comprising the above-mentioned copolymer rubber.

BACKGROUND OF THE INVENTION

Ethylene/propylene rubbers (EPM) or ethylene/propylene /diene rubbers (EPDM) are excellent in weathering resistance, ozone resistance and thermal aging resistance, because they have no double bond in a main chain of the molecular structure. Owing to these excellent properties, the ethylene/propylene/diene rubbers have been widely used for various automotive parts where static force is applied, such as weatherstripping, channel for door glass run and radiator hose.

On the other hand, for most of automotive parts requiring mechanical strength against dynamic force, such as tire, rubber vibration insulator and wiper blade, there have been used conjugated diene rubbers having double bond in a main chain of the molecular structure, such as NR, SBR, IR and BR, and blends thereof.

By the way, in accordance with high performance of automobiles in recent years, it has been eagerly desired to improve thermal aging resistance and weathering resistance of automotive parts.

However, the conjugated diene rubbers are poor in heat resistance and weathering resistance though they are excellent in dynamic mechanical characteristics (dynamic fatigue resistance), whereas EPDM is bad in dynamic mechanical characteristics though it is excellent in weathering resistance, ozone resistance and thermal aging resistance.

On that connection, studies on various blends of EPDM and the conjugated diene rubbers have been made by blending EPDM with the conjugated diene rubber to exhibit advantages of these materials.

Techniques with respect to the blends of EPDM and the conjugated diene rubbers in the above studies are listed in "Japanese Rubber Institute Bulletin, 51,685" by Yasuhiro Oda and Masashi Aoshima, 1978. In this bulletin are introduced as blending means (1) polysulfide vulcanization, (2) peroxide vulcanization, (3) use of prevulcanized EPDM, (4) use of EPDM having a high iodine value, (5) use of halogenated EPDM, and (6) use of an accelerator having a long chain alkyl group.

However, any of those means has no practical effect, and almost no product has been produced yet utilizing those means. The reason is that a vulcanization speed of the conventional EPDM is extremely slow as compared with the conjugated diene rubber. That is, because of the slow vulcanization speed of EPDM, a mixture of EPDM and the conjugated diene rubber is insufficient in mutual vulcanization between EPDM and the conjugated diene rubber, and hence mechanical strength of the mixture is deteriorated.

Accordingly, in order to obtain a rubber composition having advantages of both the conjugated diene rubber and EPDM, there has been eagerly desired the advent of a polymer not only showing low-temperature flexibility of the same level as that of the conjugated diene rubber and heat resistance and weathering resistance of the same levels as those of EPDM but also having an extremely high vulcanization speed.

Copolymerization of ethylene with α-olefin (e.g., propylene) and 7-methyl-1,6-octadiene (also referred to as "MOD" hereinafter) in the presence of a catalyst comprising a vanadium compound which has been conventionally used for preparing an ethylene/propylene/non-conjugated diene copolymer rubber has been tried, but it is impossible to industrially copolymerize these olefins because activities of the catalysts are markedly deteriorated.

Further, a copolymer of ethylene, α-olefin (e.g., propylene) and MOD obtained by using a catalyst comprising a titanium compound which has been conventionally used for preparing polyethylene or polypropylene has a wide composition distribution and poor vulcanization properties. Moreover, this copolymer can be difficultly prepared in a homogeneous solution because a copolymer having high ethylene content is precipitated during the preparation of the copolymer.

As prior art, Japanese Patent Laid-Open Publication No. 2(1990)-51512 discloses an unsaturated ethylene/α-olefin random copolymer whose vulcanization speed is higher as compared with conventional unsaturated ethylene/α-olefin random copolymers. The unsaturated ethylene/α-olefin random copolymer disclosed in this publication is a random copolymer derived from ethylene, α-olefin of 3 to 12 carbon atoms and a non-conjugated diene compound represented by the following formula [I]and characterized in that:

1) a number-average molecular weight is in the range of 3,000 to 500,000 in terms of polystyrene;

2) a weight-average molecular weight is in the range of 6,000 to 5,000,000 in terms of polystyrene;

3) a content of the non-conjugated diene compound is not less than 3 in terms of iodine value; and 4) a bonding ratio of ethylene to α-olefin is 5-90/95-10 (molar ratio).

wherein n is an integer of 2 to 10, $R^1$ is an alkyl group of 1 to 8 carbon atoms, and $R^2$ and $R^3$ are the same or different from each other and are each independently a hydrogen atom or an alkyl group of 1 to 8 carbon atoms.

Japanese Patent Laid-Open Publication No. 2(1990)-64111 discloses a process for preparing an EPDM elastomer of low crystallinity and high molecular weight using a catalyst formed from a metallocene compound of titanium, zirconium or hafnium and aluminoxane.

However, the above-mentioned publications do not disclose any ethylene/α-olefin/7-methyl-1,6-octadiene copolymer rubber having a narrow composition distribution and excellent low-temperature flexibility.

In the light of the foregoing, the present inventors have earnestly studied catalysts, and found that ethylene, α-olefin and 7-methyl-1,6-octadiene can be copolymerized with high activities when a Group IVB transition metal catalyst containing a specific zirconium catalyst component is used. In the present invention, ethylene is copolymerized with α-olefin (e.g., propylene) and MOD in the presence of a specific Group IVB transition metal catalyst.

Further, the present inventors have studied on co-catalysts, and found that the copolymer obtained by copolymerizing ethylene, α-olefin (e.g., propylene) and MOD in the presence of a catalyst system wherein an organoaluminum oxycompound is used as a co-catalyst in combination with a Group IVB transition metal catalyst such as zirconium compound has a narrow composition distribution and excellent low-temperature flexibility. Furthermore, they have also found that when the above-mentioned copolymer is covulcanized with a conjugated diene rubber, this copolymer exhibits excellent covulcanizability with the conjugated diene rubber, and that this copolymer provides a composition capable of forming a vulcanized rubber which is excellent in weathering resistance, ozone resistance, thermal aging resistance and low-temperature flexibility without being deteriorated in the high mechanical characteristics, abrasion resistance and dynamic fatigue resistance inherently belonging to the conjugated diene rubber such as natural rubber (NR), styrene/butadiene rubber (SBR), isoprene rubber (IR) or butadiene rubber (BR). Thus, the present invention has been accomplished.

OBJECT OF THE INVENTION

It is a first object of the invention to provide a novel ethylene/α-olefin/7-methyl-1,6-octadiene copolymer rubber having a narrow composition distribution and excellent low-temperature flexibility.

It is a second object of the invention to provide a rubber composition comprising the ethylene/α-olefin/7-methyl-1,6-octadiene copolymer rubber and a conjugated diene rubber capable of forming a vulcanized rubber which is excellent in low-temperature flexibility, weathering resistance and heat resistance without being deteriorated in the high mechanical characteristics and oil resistance inherently belonging to a conjugated diene rubber, wherein the above-mentioned novel ethylene/α-olefin/7-methyl-1,6-octadiene copolymer rubber has a low-temperature flexibility and vulcanization speed of almost the same levels as those of the conjugated diene rubber.

SUMMARY OF THE INVENTION

A first ethylene/α-olefin/7-methyl-1,6-octadiene copolymer rubber according to the present invention is a random copolymer rubber and is characterized in that:

(i) a molar ratio of ethylene to α-olefin (ethylene/α-olefin) is in the range of 40/60 to 90/10;

(ii) a content of 7-methyl-1,6-octadiene is in the range of 0.4 to 25% by mol;

(iii) an intrinsic viscosity [η], as measured in decahydronaphthalene at 135° C., is from 0.1 dl/g to 8 dl/g.

(iv) an intensity ratio D of Tαβ to Tαα (Tαβ/Tαα) in a $^{13}$C-NMR spectrum of the copolymer rubber is not more than 0.5;

(v) a B value determined by a $^{13}$C-NMR spectrum of the copolymer rubber and the following formula is in the range of 1.00 to 1.50; and (vi) a glass transition temperature Tg measured by DSC is not higher than −53° C.;

$$B = P_{oE}/(2P_E]P_o)$$

wherein $P_E$ is a molar fraction of the ethylene units derived from ethylene contained in the random copolymer rubber; $P_o$ is a molar fraction of the α-olefin units derived from the α-olefin contained in the random copolymer rubber; and $P_{OE}$ is a ratio of the number of α-olefin/ethylene chains to the number of all dyad chains in the random copolymer rubber.

A second ethylene/α-olefin/7-methyl-1,6-octadiene copolymer rubber according to the present invention is a random copolymer rubber obtained by copolymerizing ethylene, α-olefin and 7-methyl-1,6-octadiene in the presence of a catalyst comprising (a) a Group IVB transition metal compound containing a ligand having cyclopentadienyl skeleton and (b) an organoaluminum oxycompound, wherein the ethylene/α-olefin/7-methyl-1,6-octadiene copolymer rubber is characterized in that (i) a molar ratio of ethylene to α-olefin (ethylene/α-olefin) is in the range of 40/60 to 90/10;

(ii) a content of 7-methyl-1,6-octadiene is in the range of 0.4 to 25% by mol;

(iii) an intrinsic viscosity [η], as measured in decahydronaphthalene at 135° C., is from 0.1 dl/g to 8 dl/g;

(iv) an intensity ratio D of Tαβ to Tαα (Tαβ/Tαα) in a $^{13}$C-NMR spectrum of the copolymer rubber is not more than 0.5;

(v) a B value determined by a $^{13}$C-NMR spectrum of the copolymer rubber and the above-mentioned formula is in the range of 1.00 to 1.50; and (vi) a glass transition temperature Tg measured by DSC is not higher than −53° C.

A first ethylene/α-olefin/7-methyl-1,6-octadiene copolymer rubber composition according to the present invention comprising a random copolymer rubber of ethylene, α-olefin and 7-methyl-1,6-octadiene and a conjugated diene rubber, wherein the ethylene/α-olefin/7-methyl-1,6-octadiene copolymer rubber is characterized in that (i) a molar ratio of ethylene to α-olefin (ethylene/α-olefin) in the random copolymer rubber is in the range of 40/60 to 90/10;

(ii) a content of 7-methyl-1,6-octadiene in the random copolymer rubber is in the range of 0.4 to 25 % by mol;

(iii) an intrinsic viscosity [η] of the random copolymer rubber, as measured in decahydronaphthalene at 135° C., is from 0.1 dl/g to 8 dl/g;

(iv) an intensity ratio D of Tαβ to Tαα (Tαβ/Tαα) in a $^{13}$C-NMR spectrum of the random copolymer rubber is not more than 0.5;

(v) a B value determined by a $^{13}$C-NMR spectrum of the random copolymer rubber and the above-mentioned formula is in the range of 1.00 to 1.50; and (vi) a glass transition temperature Tg of the random copolymer rubber measured by DSC is not higher than −53° C.

A second ethylene/α-olefin/7-methyl-1,6-octadiene copolymer rubber composition according to the present invention comprising a random copolymer rubber and a conjugated diene rubber, said random copolymer rubber being obtained by copolymerizing ethylene, α-olefin and 7-methyl-1,6-octadiene in the presence of a catalyst formed from (a) a Group IVB transition metal compound containing a ligand having cyclopentadienyl skeleton and (b) an organoaluminum oxycompound, wherein the ethylene/α-olefin/7-methyl-1,6-octadiene copolymer rubber is characterized in that (i) a molar ratio of ethylene to α-olefin (ethylene/α-olefin) in the random copolymer rubber is in the range of 40/60 to 90/10;

(ii) a content of 7-methyl-1,6-octadiene in the random copolymer rubber is in the range of 0.4 to 25 % by mol;

(iii) an intrinsic viscosity $[\eta]$ of the random copolymer rubber, as measured in decahydronaphthalene at 135° C., is from 0.1 dl/g to 8 dl/g;

(iv) an intensity ratio D of $T\alpha\beta$ to $T\alpha\alpha(T\alpha\beta/T\alpha\alpha)$ in a $^{13}$C-NMR spectrum of the random copolymer rubber is not more than 0.5;

(v) a B value determined by a $^{13}$C-NMR spectrum of the random copolymer rubber and the above-mentioned formula is in the range of 1.00 to 1.50; and (vi) a glass transition temperature Tg of the random copolymer rubber measured by DSC is not higher than −53° C.

A zirconium compound is preferably used as the above-mentioned Group IVB transition metal compound (a).

In the invention, particularly preferred as the above-mentioned random copolymer rubber is an ethylene/α-olefin/7-methyl-1,6-octadiene copolymer rubber obtained by using a catalyst comprising a zirconium compound containing a ligand having cyclopentadienyl skeleton, the organoaluminum oxycompound (b) and an organoaluminum compound (c).

In the rubber composition of the invention, it is desirable that the content of the random copolymer rubber is in the range of 5 to 95 parts by weight and the content of the conjugated diene rubber is in the range of 5 to 95 parts by weight, with the proviso that the total amount of the above-mentioned both rubbers is 100 parts by weight.

DETAILED DESCRIPTION OF THE INVENTION

The ethylene/α-olefin/7-methyl-1,6-octadiene copolymer rubber and the composition thereof according to the present invention are described in detail hereinafter.

At first, the ethylene/α-olefin/7-methyl-1,6-octadiene copolymer rubber of the invention is described below.

The ethylene/α-olefin/7-methyl-1,6-octadiene copolymer rubber of the invention is a random copolymer rubber of ethylene, α-olefin and 7-methyl-1,6-octadiene.

The α-olefin employable in the invention has 3 to 20 carbon atoms. Concrete examples of the α-olefin include propylene, 1 butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. These α-olefins are used singly or in combination.

In the invention, preferably used is α-olefin of 3 to 6 carbon atoms, and particularly preferably used is α-olefin of 3 carbon atoms, namely, propylene.

The present inventors have earnestly studied to pursue a rubber composition capable of providing a vulcanized rubber which is excellent in low-temperature flexibility, weathering resistance and heat resistance without being deteriorated in high mechanical characteristics and oil resistance inherently belonging to a conjugated diene type rubber. As a result, they have found that a rubber comprising an ethylene/propylene/7-methyl-1,6-octadiene copolymer rubber having the specific structure and properties is capable of providing a vulcanized rubber showing almost the same vulcanization speed as that of the conjugated diene rubber such as NR or SBR and having the above-mentioned excellent properties. Further, the present inventors have also found that an ethylene/α-olefin/7-methyl-1,6-octadiene copolymer rubber of ethylene, α-olefin other than propylene and MOD also has the above-mentioned characteristics.

The ethylene/α-olefin/7-methyl-1,6-octadiene copolymer rubber according to the invention can be obtained by copolymerizing ethylene, α-olefin and MOD in the presence of a Group IVB transition metal catalyst, and preferably in the presence of a specific zirconium catalyst. A process for preparing this random copolymer rubber will be described later.

As described above, copolymerization of ethylene, α-olefin (e.g., propylene) and MOD in the presence of a vanadium catalyst or a titanium catalyst which has been conventionally used for preparing EPDM has been tried, but is impossible to industrially copolymerize these components because activities of the catalysts are markedly deteriorated. Therefore, the present inventors have earnestly studied catalysts, and found that the catalyst comprising a specific zirconium catalyst component shows high polymerization activities.

The random copolymer rubber of the invention has the following composition and physical properties.

(i) This random copolymer rubber has a molar ratio of ethylene to α-olefin (ethylene/α-olefin) ranging from 40/60 to 90/10, preferably from 55/45 to 85/15. When the random copolymer rubber is blended with a diene rubber, the molar ratio is particularly preferably in the range of 65/35 to 80/20. By blending the random copolymer rubber having the molar ratio in the above range with the conjugated diene rubber, there can be obtained a rubber composition having high mechanical strength and low-temperature flexibility even at a low temperature.

(ii) The random copolymer rubber has a content of 7-methyl-1,6-octadiene (MOD), which is non-conjugated diene, ranging from 0.4 to 25% by mol, preferably from 0.5 to 7% by mol. When the random copolymer rubber is blended with a diene rubber, the content of MOD is particularly preferably in the range of 1 to 4% by mol. For example, an ethylene/propylene/7-methyl-1,6-octadiene copolymer rubber having a MOD content within the above range is excellent in covulcanizability with a conjugated diene rubber, and using this copolymer rubber, there can be obtained a rubber composition having high thermal aging resistance inherently belonging to the ethylene/propylene/7-methyl-1,6-octadiene.

In the case where EPDM containing the MOD unit as a diene component (sometimes abbreviated to "MOD-EPDM" hereinafter) is compared with EPDM containing 5-ethylidene-2-norbornene unit (sometimes abbreviated to "ENB" hereinafter) as a diene component (sometimes abbreviated to "ENB-EPDM" hereinafter) on the basis of the same diene content, the vulcanization speed of MOD-EPDM is higher than that of ENB-EPDM by not less than 2 times.

In order to improve the vulcanization speed of the ENB-EPDM prepared using a Group VB transition metal catalyst comprising a vanadium catalyst component, it can be thought to increase the diene content therein. However, when the diene content exceeds 4% by mol, the ENB-EPDM cannot be improved in the vulcanization speed. On the other hand, the vulcanization speed of the MOD-EPDM prepared using a Group IVB transition metal catalyst comprising a specific zirconium catalyst component can be made higher in proportion to the diene content therein until the diene content becomes 7% by mol.

Further, the ENB-EPDM prepared using a Group VB transition metal catalyst comprising a vanadium catalyst component is deteriorated in the low-temperature flexibility in proportion as the diene content is increased in order to make the vulcanization speed of the ENB-EPDM higher. On the other hand, the MOD-EPDM prepared using a Group IvB transition metal catalyst comprising a specific zirconium catalyst component shows excellent low-temperature flexibility independent of the diene content.

(iii) The random copolymer rubber has an intrinsic viscosity $[\eta]$, as measured in decahydronaphthalene at 135° C., is from 0.1 dl/g to 8 dl/g, preferably from 0.2 dl/g to 6 dl/g. When the random copolymer rubber is blended with a diene rubber, this random copolymer rubber particularly preferably has the intrinsic viscosity $[\eta]$ satisfying the condition of 0.3 dl/g $< [\eta] < 5$ dl/g. The random copolymer rubber having the intrinsic viscosity in the above range has good blending properties with a conjugated diene rubber, and by using this copolymer rubber, there can be obtained a rubber composition capable of providing a vulcanized rubber maintaining high mechanical strength of the conjugated diene rubber and showing excellent heat resistance and weathering resistance.

(iv) The random copolymer rubber has an intensity ratio D of $T\alpha\beta$ to $T\alpha\alpha$ ($T\alpha\beta/T\alpha\alpha$) in its $^{13}$C-NMR spectrum of not more than 0.5. A preferred intensity ratio D varies depending on the kind of $\alpha$-olefin constituting the random copolymer rubber.

The intensity ratio D of the random copolymer rubber of the invention is calculated based on the results obtained by the $^{13}$C-NMR spectrum measurement in accordance with the following method.

That is, the $^{13}$C-NMR spectrum measurement is carried out in a solution of a mixture of hexachlorobutadiene and $d_6$-benzene (hexachlorobutadiene/$d_6$-benzene = 2/1 by volume) which has a polymer concentration of 5 % by weight by means of a JEOL-GX270NMR measuring device (produced by Nippon Denshi K.K.) under the conditions of 67.8 MHz, 25° C. and 128 ppm of $d_6$-benzene.

The analysis of the NMR spectrum and peak assignments are basically conducted in accordance with the proposal of Lindemann Adams (Analysis Chemistry 43, p 1245 (1971)), J.C. Randall (Review Macromolecular Chemistry Physics, C29, 201 (1989)).

The intensity ratio D is now illustrated referring to an ethylene/propylene/7-methyl-1,6-octadiene copolymer rubber.

In the $^{13}$C-NMR spectrum of this copolymer rubber, peaks appearing at 45 to 46 ppm and peaks appearing at 32 to 33 ppm are assigned to $T\alpha\alpha$ and $T\alpha\beta$, respectively, and integral values of each peak portions are determined. From those integral values, the above-mentioned intensity ratio D is calculated.

The intensity ratio D thus obtained is generally thought to be a measure of a proportion at which a 2,1 addition reaction of propylene takes place successively after a 1,2 addition reaction thereof or a proportion at which a 1,2 addition reaction of propylene takes place successively after a 2,1 addition reaction thereof. Accordingly, as this intensity ratio D becomes larger, the bonding direction of a monomer copolymerizable with ethylene becomes more irregular. In contrast thereto, as the intensity ratio D becomes smaller, the bonding direction of a monomer copolymerizable with ethylene becomes more regular. In the case where the bonding direction is of high regularity, molecule chains are easily aggregated, resulting in a possibility of improving physical properties of the polymer such as strength. In the invention, accordingly, the intensity ratio D preferably is as small as possible.

In the invention, the intensity ratio D of $T\alpha\beta$ to $T\alpha\alpha$ ($T\alpha\beta/T\alpha\alpha$) is not more than 0.5, preferably not more than 0.1, more preferably not more than 0.05.

By copolymerizing ethylene, propylene and 7-methyl-1,6-octadiene in the presence of a Group IvB transition metal catalyst comprising a Group IVB transition metal catalyst component such as a specific zirconium compound, an ethylene/propylene/7-methyl-1,6-octadiene copolymer rubber having the intensity ratio D of not more than 0.5 can be obtained.

However, even if ethylene is copolymerized with propylene and 7-methyl-1,6-octadiene in the presence of a Group VB transition metal catalyst comprising a vanadium catalyst component, any ethylene/propylene/7-methyl-1,6-octadiene copolymer rubber having the intensity ratio D of not more than 0.5 cannot be obtained. This Group VB transition metal type catalyst does not include a Group IVB transition metal catalyst component containing a ligand having cyclopentadienyl skeleton.

The above-mentioned fact can be said also with respect to other $\alpha$-olefin than propylene.

(v) The random copolymer rubber has a B value, determined by a ::C-NMR spectrum of the copolymer rubber and the following formula, ranging from 1.00 to 1.50, preferably from 1.02 to 1.50, more preferably from 1.02 to 1.45, particularly preferably from 1.02 to 1.40.

$$B = P_{OE}/(2P_E \cdot P_O)$$

wherein $P_E$ is a molar fraction of the ethylene units derived from ethylene contained in the random copolymer rubber; $P_O$ is a molar fraction of the $\alpha$-olefin units derived from $\alpha$-olefin contained in the random copolymer rubber; and $P_{OE}$ is a ratio of the number of $\alpha$-olefin-/ethylene chains to the number of all dyad chains in the random copolymer rubber.

This B value is a measure of distribution state of each monomer in the copolymer chain, and can be determined by measuring values of the above-defined $P_E$, $P_O$ and $P_{OE}$ in accordance with the reports by J.C. Randall (Macromolecules, 15,353 (1982)) and J. Ray (Macromolecules, 10,773 (1977)) and introducing the obtained values into the above formula.

As the B value becomes larger, the block chain of ethylene or $\alpha$-olefin becomes shorter, and this means that the distribution of ethylene or $\alpha$-olefin is uniform and the composition distribution of the resultant copolymer is narrow. In contrast thereto, as the B value becomes smaller, the composition distribution of the copolymer becomes wider. The copolymer having a wide composition distribution is unfavorable, because the copolymer does not exhibit sufficiently high physical properties such as strength after vulcanized, as compared with the copolymer having a narrow composition distribution.

By copolymerizing ethylene with α-olefin and 7-methyl-1,6-octadiene in the presence of a Group IVB transition metal catalyst comprising a specific Group IVB transition metal catalyst component, there can be obtained an ethylene/α-olefin/7-methyl-1,6-octadiene copolymer rubber having the B value of 1.00 to 1.50.

However, even if ethylene is copolymerized with α-olefin and 7-methyl-1,6-octadiene in the presence of a Group IVB transition metal catalyst comprising a titanium catalyst component, any ethylene/α-olefin/7-methyl-1,6-octadiene copolymer rubber having the B value in the above range cannot be obtained. This Group IVB transition metal catalyst does not include a Group IVB transition metal catalyst component containing a ligand having cyclopentadienyl skeleton.

(vi) The random copolymer rubber has a glass transition temperature Tg measured by DSC of not higher than −53° C.

When the random copolymer rubber having a glass transition temperature Tg of not higher than −53° C. is used, there can be obtained a rubber composition capable of providing a vulcanized rubber having excellent low-temperature flexibility.

The above-mentioned random copolymer rubber can be prepared by copolymerizing ethylene with α-olefin and MOD in the presence of a Group IVB transition metal catalyst comprising a Group IVB transition metal catalyst component such as specific zirconium compound or titanium compound, as described above.

Preferred examples of the Group IVB transition metal catalyst include a Group IVB transition metal catalyst comprising a zirconium compound containing a ligand having cyclopentadienyl skeleton and an organoaluminum oxycompound (b), and a Group IVB transition metal catalyst comprising a zirconium compound containing a ligand having cyclopentadienyl skeleton, an organoaluminum oxycompound (b) and an organoaluminum compound (c). In the invention, the latter Group IVB transition metal catalyst is particularly preferably employed.

The Group IVB transition metal catalyst containing a ligand having cyclopentadienyl skeleton (a) is a compound concretely represented by the formula $$ML_x \qquad [I]$$

wherein M is a transition metal, preferably zirconium, L is a ligand coordinating to the transition metal, at least one of L is a ligand having a cyclopentadienyl skeleton, L other than the ligand having a cyclopentadienyl skeleton is a hydrocarbon group of 1–12 carbon atoms, an alkoxy group, an aryloxy group, trialkylsilyl group, $SO_3R$ (wherein R is a hydrocarbon group of 1 to 8 carbon atoms which may have a substituent such as halogen), halogen atom or hydrogen atom, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4,5,6,7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the zirconium compound represented by the above formula [I] contains two or more ligands having a cyclopentadienyl skeleton, two ligands having a cyclopentadienyl skeleton may be bonded together via an alkylene group such as ethylene and propylene, a substituted alkylene group such as isopropylidene and diphenylmethylene, a silylene group or a substituted silylene group such as dimethylsilylene, diphenylsilylene and methylphenylsilylene.

Following ligands may be exemplified as the ligand other than those having a cyclopentadienyl skeleton.

The hydrocarbon group having 1–12 carbon atoms includes, for example, alkyl, cycloalkyl, aryl and aralkyl;

the alkyl group includes methyl, ethyl, propyl, isopropyl butyl, and pentyl;

the cycloalkyl group includes, for example, cyclopentyl and cyclohexyl;

the aryl group includes, for example, phenyl and tolyl; and the aralkyl group includes, for example, benzyl and neophyl.

The alkoxy group includes, for example, methoxy, ethoxy and butoxy;

the aryloxy group includes, for example, phenoxy; and the halogen includes, for example, fluorine, chlorine, bromine and iodine.

The ligand represented by $SO_3R$ includes, for example, p-toluenesulfonate, methanesulfonate and trifluoromethanesulfonate.

When the transition metal is zirconium having a valence of 4, the zirconium compound (a) containing ligands having a cyclopentadienyl skeleton may be represented more concretely by the formula $$R^1{}_k R^2{}_l R^3{}_m R^4{}_n M \qquad [II]$$

wherein M is zirconium, $R^1$ is a group (ligand) having a cyclopentadienyl skeleton, $R^2$, $R^3$ and $R^4$ are each a group having a cyclopentadienyl skeleton, an alkyl group, cycloalkyl group, aryl group, aralkyl group, alkoxy group, aryloxy group, trialkylsilyl group, $SO_3R$ group, halogen atom or hydrogen atom, k is an integer of at least 1, and $k+l+m+n=4$.

In the transition metal compounds of the above-mentioned formula $R^1{}_k R^2{}_l R^3{}_m R^4{}_n M$, at least two of $R^2$, $R^3$ and $R^4$ preferably have a cyclopentadienyl skeleton, for example, $R^2$ and $R^3$ are each a group having a cyclopentadienyl skeleton. These groups having a cyclopentadienyl skeleton may be bonded to each other via an alkylene group such as ethylene and propylene, a substituted alkylene group such as isopropylidene, diphenylmethylene, a silylene group or a substituted silylene group such as dimethylsilylene, diphenylsilylene and methylphenylsilylene. Also, $R^3$ and $R^4$ may be each a group having a cyclopentadienyl skeleton, an alkyl group, cycloalkyl group, aryl group, aralkyl group, alkoxy group, aryloxy group, trialkylsilyl group, $SO_3R$, halogen atom or hydrogen atom. Listed below are typical representatives of the zirconium metal compounds.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride, Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methyl zirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(methanesulfonate),
Bis(cyclopentadienyl)zirconium bis (p-toluenesolfunate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned zirconium compound, the di-substituted cyclopentadienyl groups include 1,2- and 1,3-substituted groups, and the tri-substituted cyclopentadienyl groups include 1,2,3- and 1,2,4- substituted groups. Also the alkyl groups such as propyl and butyl include n-, i-, sec- and tert- isomers.

These compounds may be used alone or in combination of two or more.

Further, those compounds may be used after being diluted in hydrocarbon or halogenated hydrocarbon.

Such zirconium compound as mentioned above can be supported on a carrier by bringing it into contact with a particulate carrier compound.

Examples of the carrier compounds employable in the invention include inorganic carrier compounds such as $SiO_2$, $Al_2O_3$, $B_2O_3$, $MgO$, $ZrO_2$, $CaO$, $TiO_2$, $ZnO$, $SnO_2$, $BaO$ and $ThO$; and resins such as polyethylene, polypropylene, poly-1-butene, poly-4-methyl-1-pentene and a styrene/divinylbenzene copolymer.

These carrier compounds may be used in combination of two or more kinds.

Among the above-mentioned compounds, preferably used are $SiO_2$, $Al_2O_3$ and $MgO$.

The organoaluminum oxycompound (b) used in the invention may be aluminoxane hitherto known or such benzene-insoluble organoaluminum oxy compounds disclosed in Japanese Patent Laid-open Publication 2(1990)-78687.

The aluminoxane may be prepared, for example, by the following methods.

(1) A method wherein suspensions of compounds containing adsorbed water or salts containing water of crystallization, for example, magnesium chloride hydrate, copper sulfate hydrate, aluminum sulfate hydrate, nickel sulfate hydrate and cerium (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide such as dimethyltin oxide and dibutyltin oxide in a solvent such as decane, benzene or toluene.

Of these, preffered is the method of (1). The aluminoxane as illustrated above may contain small amounts of organometallic components other than aluminum. From the above-mentioned solution containing aluminoxane as recovered, the solvent or unaltered organoaluminum compound is removed by distillation, and the remaining aluminoxane may dissolved again in a solvent.

The organoaluminum compound used in preparing the aluminoxane includes specifically trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Furthermore, the isoprenylaluminum represented by the general formula may also be used.

$$(i\text{-}C_4H_9)_xAl_y(C_5H_{10})_z \qquad [III]$$

wherein x, y and z are each a positive number, and $z \geq 2x$.

Of these, trialkylaluminum and tricyloalkylaluminum are particularly preferred.

Solvents used in preparing the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or halogenated hydrocarbons such as halides, particularly chloride and bromides, of the above-mentioned aromatic, aliphatic and alicyclic hydrocarbons. In addition thereto, there may also be used ethers other than ethyl ether and tetrahydrofuran. Of these solvents as exemplified above, particularly preferred are aromatic hydrocarbons.

Next, the organometallic compound catalyst component (c) containing a metal selected from metals in Group I to Group III of a periodic table which is used for preparing the α-olefin/polyene copolymer-containing polymer [I] will be described.

The organoaluminum compound (c) used in the present invention includes, for example, the organoaluminum compound represented by the formula:

$$R^a{}_nAlX_{3-n} \qquad [IV]$$

wherein $R^a$ is hydrocarbon of 1-12 carbon atoms, X is halogen or hydrogen, and n is 1-3.

In the above-mentioned formula, $R^a$ is hydrocarbon group of 1-12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in particular, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds (c), there may also be used a compound represented by the following formula:

$$R^a{}_nAlY_{3-n} \qquad [V]$$

wherein $R^a$ is as defined above, Y is $-OR^b$, $-OSiR^c{}_3$, $-OAlR^d{}_2$, $-NR^e{}_2$, $-SiR^f{}_3$, or $-N(R^g)AlR^h{}_2$, n is 1—2 and $R^b$, $R^c$, $R^d$ and $R^h$ are each methyl, ethyl, isopropyl, isobutyl, cyclohexyl, phenyl, etc;

$R^e$ is hydrogen, methyl, ethyl, isopropyl, phenyl, trimethylsilyl, etc; and Rf and Rg are each methyl, ethyl, etc.

The organoaluminum compounds (c) include, in particular, such compounds as mentioned below.

(i) Compounds of the formula $R^a{}_nAl(OR^b)_{3-n}$ such as dimethylaluminum methoxide, diethylaluminum ethoxide, diisobutylaluminum methoxide, etc;

(ii) Compounds of the formula $R^a{}_nAl(OSiR^c{}_3)_{3-n}$ such as Et_2Al(OSiMe_3), (iso-Bu)_2Al(OSiMe_3). (iso-Bu)_2Al-(OSiEt_3),etc;

(iii) Compounds of the formula $R^a{}_nAl(OAlR^d{}_2)_{3-n}$ such as Et_2AlOAlEt_2, (iso-Bu)_2AlOAl(iso-Bu)_2, etc;

(iv) Compounds of the formula $R^a{}_nAl(NR^e{}_2)_{3-n}$ such as Me_2AlNEt_2, Et_2AlNHMe, Me_2AlNHEt; Et_2AlN-(Me_3Si)_2, (iso-Bu)_2AlN(Me_3Si)_2, etc;

(v) Compounds of the formula $R^a{}_nAl(SiR^f{}_3)_{3-n}$ such as (iso-Bu)_2AlSiMe_3, etc; and (vi) Compounds of the formula $R^a{}_nAl[N(R^g)-AlR^h{}_2]_{3-n}$ such as Et_2AlN(Me)-AlEt_2, (iso-Bu)_2AlN(Et)Al(iso-Bu)_2, etc.

Of the organoaluminum compounds (c) as exemplified above, preferred are those of the formula $R^a{}_3Al$, $R^a{}_nAl(OR^b)_{3-n}$ or $R^a{}_nAl(OAlR^d{}_2)_{3-n}$, especially an organoaluminum compound wherein $R^a$ is isoalkyl and n=2 is preferred.

These organoaluminum compounds may be used alone or in combination of two or more.

The Group IVB transition metal catalyst containing specific Group IVB transition metal catalyst components used in the invention comprises (a) the Group IVB transition metal compound containing the ligands having a cyclopentadienyl skeleton described above such as a specific zirconium compound, (b) the organoaluminum oxycompound and, if necessary, (c) the organoaluminum compound.

In the invention, the zirconium compound contained in the Group IVB transition metal compound (a) is used in an amount of usually about 0.00005-0.1 mm mol, preferably about 0.0001-0.05 mm mol in terms of zirconium atoms per 1 l of polymerization volumes.

Further, the organoaluminum oxy compound (b) is used in an amount of usually about 1-10,000 mol, preferably about 10–5,000 mol of aluminum atoms per 1 l of zirconium atoms.

The organoaluminum compound (c) is used in an amount of usually about 0–200 mol, preferably about 0–100 mol per 1 l of aluminum atoms of the organoaluminum oxycompound (b).

In the copolymerization of ethylene, α-olefin and 7-methyl-1,6-octadiene, the above-mentioned Group IVB transition metal compound (a), organoaluminum oxycompound (b) and organoaluminum compound (c), constituting the Group IVB transition metal type catalyst, may be independently fed to a polymerization reactor. Otherwise, prior to the copolymerization, the Group IvB transition metal catalyst comprising the Group IVB transition metal catalyst component may be prepared and fed the catalyst to the polymerization reactor.

Figure 1:
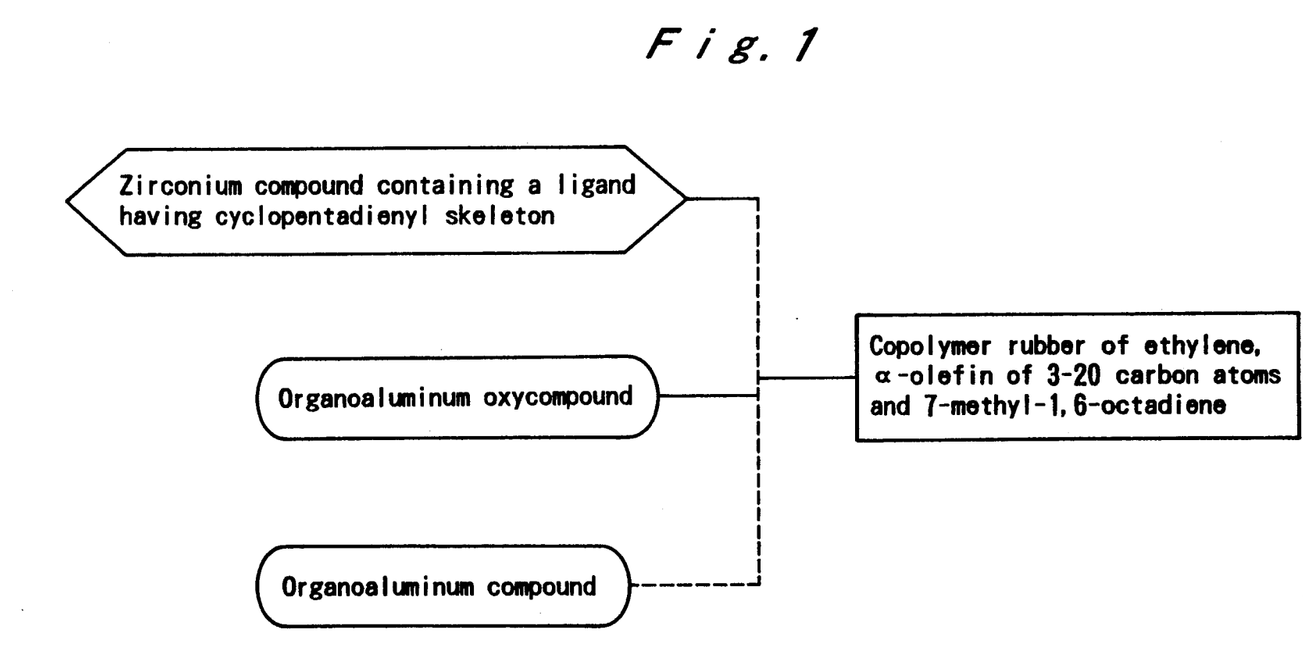
FIG. 1 is one example of a flow chart illustrating steps for preparing a catalyst for olefin polymerization employable for the preparation of a random copolymer rubber of ethylene, α-olefin and 7-methyl-1,6-octadiene in the present invention.

FIG. 1 illustrates steps for preparing the Group IVB transition metal catalyst comprising a zirconium catalyst component employable for the preparation of the random copolymer rubber of the invention.

Specific examples of inert hydrocarbon media used for preparing the Group IvB transition metal catalyst comprising a Group IVB transition metal catalyst component such as a zirconium compound include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these hydrocarbons.

The temperature of contacting the Group IVB transition metal compound (a) with the organoaluminum oxycompound (b) and the organoaluminum compound (c) is usually in the range of $-100$ to $200°$ C., preferably $-70$ to $100°$ C.

The copolymerization of ethylene, α-olefin and 7-methyl-1,6-octadiene is carried out at a temperature of usually $-20$ to $200°$ C., preferably 0 to $150°$ C., more preferably 20 to $120°$ C., and at a pressure of usually an atmospheric pressure to 100 kg/cm$^2$, preferably an atmospheric pressure to 50 kg/cm$^2$, more preferably an atmospheric pressure to 30 kg/cm$^2$.

The molecular weight of the random copolymer rubber can be regulated by varying the polymerization conditions such as a polymerization temperature or by controlling the amount of hydrogen (molecular weight regulator) used.

The polymerization may be carried out either batchwise, semi-continuously or continuously, but it is preferably carried out continuously. Further, the polymerization may be carried out in two or more steps having reaction conditions different from each other.

The copolymer resulting immediately after the polymerization is recovered from the polymer solution by a method conventionally known, and then dried to obtain a solid random copolymer rubber.

Next, the ethylene/α-olefin/7-methyl-1,6-octadiene copolymer rubber composition of the invention is described below.

The ethylene/α-olefin/7-methyl-1,6-octadiene copolymer rubber composition of the invention comprises the random copolymer rubber and a conjugated diene rubber.

The random copolymer rubber is the aforementioned ethylene/α-olefin/7-methyl-1,6-octadiene copolymer rubber according to the invention.

In the invention, the random copolymer rubber is used in an amount of 5 to 95 parts by weight, preferably 10 to 60 parts by weight, based on 100 parts by weight of the total amount of the random copolymer rubber and the conjugated diene rubber.

The conjugated diene rubber is a homopolymer of a conjugated diene compound or a copolymer of a conjugated diene compound and another olefin. The conjugated diene rubber is broadly classified into natural rubber and synthetic rubber.

Specific examples of the conjugated diene compounds employable for the invention include butadiene, isoprene and chloroprene. Examples of compounds copolymerizable with those conjugated diene compounds are vinyl compounds such as styrene and acrylonitrile.

Specific examples of the conjugated diene rubber preferably used for the invention include natural rubber (NR), isoprene rubber (IR), butadiene rubber (BR), styrene-butadiene rubber (SBR), acrylonitrile-butadiene rubber (NBR) and chloroprene rubber (CR).

Of these, isoprene type rubbers, namely, natural rubber (NR) and isoprene rubber, are particularly preferably used because they have well balanced mechanical properties.

In the invention, the conjugated diene rubber is used in an amount of 5 to 95 parts by weight, preferably 40 to 90 parts by weight, based on 100 parts by weight of the total amount of the random copolymer rubber and the conjugated diene rubber.

As described above, the ethylene/α-olefin/7-methyl-1,6-octadiene copolymer rubber composition of the invention comprises the random copolymer rubber, namely, ethylene/α-olefin/7-methyl-1,6-octadiene copolymer rubber, and the conjugated diene rubber.

In addition to those components, the rubber composition of the invention may further contain rubber reinforcing agents such as carbon black (e.g., SRF, GPF, FEF, HAF, ISAF, SAF, FT and MT) and finely-ground silicic acid; and fillers such as soft calcium carbonate, ground whiting, talc and clay. The amount and kind of the rubber reinforcing agent or the filler used can be appropriately determined depending on the purpose of the resultant rubber composition, but the amount thereof is generally at most 300 parts by weight, preferably at most 200 parts by weight, based on 100 parts by weight of the total amount of the random copolymer rubber and the conjugated diene rubber.

The rubber composition of the invention may be used in the unvulcanized state, but when the rubber composition is used as a vulcanized rubber, characteristics of the rubber composition are most conspicuously exhibited. In detail, the random copolymer rubber contained in the rubber composition of the invention acts to improve a vulcanized rubber of the composition in characteristics such as weathering resistance and ozone resistance, while the conjugated diene rubber acts to improve a vulcanized rubber of the composition in characteristics such as mechanical strength. Hence, a vulcanized rubber which is excellent in mechanical strength, weathering resistance, ozone resistance and dynamic fatigue resistance can be obtained from the rubber composition of the invention.

In the case where a vulcanized rubber is prepared from the rubber composition of the invention, additives such as rubber reinforcing agents, fillers and softening agents may be used. The kinds of those additives and the amounts thereof are appropriately determined depending on the purpose of the resultant vulcanized rubber and the performance thereof based on the purpose. Further, the kinds of compounds constituting a vulcanization system, such as a vulcanizing agent, a vulcanization accelerator and a vulcanization assisting agent, the amounts thereof, and a process for preparing a vulcanized rubber are also appropriately selected depending on the purpose of the resultant vulcanized rubber and the performance thereof based on the purpose.

As the softening agents, those generally used for rubbers can be employed. Specific examples thereof include petroleum softening agents such as process oil, lubricating oil, paraffin, liquid paraffin, petroleum asphalt and Vaseline (Reg.TM); coal tar softening agents such as coal tar and coal tar pitch; aliphatic oil softening agents such as castor oil, linseed oil, rapeseed oil and coconut oil; tall oil; factice; waxes such as beewax, carnauba wax and lanolin; aliphatic acids and aliphatic salts such as ricinolic acid, palmitic acid, barium stearate, calcium stearate and zinc laurate; and synthetic polymer materials such as petroleum resin, atactic polypropylene and coumarone-indene resin. Of these, petroleum softening agents are preferably used, and among therefrom, process oil is particularly preferably used.

The amount of the softening agent used is generally at most 150 parts by weight, preferably at most 100 parts by weight, based on 100 parts by weight of the total amount of the random copolymer rubber and the conjugated diene rubber.

For preparing a vulcanized rubber from the rubber composition of the invention, a sulfur compound described below is used as a vulcanizing agent.

Specific examples of the sulfur compound used as the vulcanizing agent include sulfur, sulfur chloride, sulfur dichloride, morpholine disulfide, alkylphenol disulfide, tetramethylthiuram disulfide and selenium dimethyldithiocarbamate. Of these, sulfur is preferably used.

The sulfur compound is used in an amount of 0.1 to 5 parts by weight, preferably 0.5 to 3 parts by weight, based on 100 parts by weight of the total amount of the random copolymer rubber and the conjugated diene rubber.

In the case of using the sulfur compound as the vulcanizing agent to prepare a vulcanized rubber from the rubber composition of the invention, a vulcanization accelerator is preferably used together with the sulfur compound.

Specific examples of the vulcanization accelerator include:

thiazole compounds such as N-cyclohexyl-2-benzothiazolesulfenamide, N-oxydiethylene-2-benzothiazolesulfenamide, N,N-diisopropyl-2-benzothiazolesulfenamide, 2-mercaptobenzothiazole, 2-(2,4-dinitrophenyl)mercaptobenzothiazole, 2-(2,6-diethyl-4-morpholinothio)benzothiazole and dibenzothiazyldisulfide;

guanidine compounds such as diphenylguanidine, triphenylguanidine, diorthotolylguanidine, orthotolylbiguanide and diphenylguanidine naphthalate;

aldehyde-amine or aldehyde-ammonia compounds, such as acetaldehyde-aniline reaction product, butylaldehydeaniline condensation product, hexamethylenetetramine and acetaldehyde-ammonia reaction product;

imidazoline type compounds such as 2-mercaptoimidazoline;

thiourea compounds such as thiocarbanilide, diethylthiourea, dibutylthiourea, trimethylthiourea and diorthotolylthiourea;

thiuram compounds such as tetramethylthiuram monosulfide, tetramethylthiuram disulfide, tetraethylthiuram disulfide, tetrabutylthiuram disulfide and pentamethylenethiuram tetrasulfide;

dithio acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate compounds such as zinc dibutyl xanthate; and other compounds such as zinc white.

The vulcanization accelerator is used in an amount of 0.1 to 20 parts by weight, preferably 0.2 to 10 parts by weight, based on 100 parts by weight of the total amount of the random copolymer rubber and the conjugated diene rubber.

The unvulcanized rubber composition is prepared by the following process. That is, the random copolymer rubber, the conjugated diene rubber and if necessary, the softening agent are kneaded in a mixing device such as a Banbury mixer at a temperature of 80 to 150° C. for 3 to 10 minutes, then to the kneadate is added the vulcanizing agent and if necessary the vulcanization accelerator or the vulcanization assisting agent, and the resultant mixture is milled using rolls such as open milling rolls at a roll temperature of 40 to 60° C. for 5 to 30 minutes. Thereafter, the mixture is extruded to give a rubber composition in the form of a ribbon or a sheet.

The rubber composition prepared as above is then molded into the desired form using an extrusion molding machine, a calender roll or a press. Vulcanization of the rubber composition is carried out either simultaneously with the above mentioned molding procedure or thereafter. That is, the rubber composition or its molded product is introduced into a vulcanizing vessel, and is vulcanized therein by heating it at a temperature of 120 to 270 ° C. for 1 to 30 minutes to obtain a vulcanized rubber. The vulcanization may be carried out using a mold or not using a mold. When a mold is not used, the molding procedure and the vulcanization procedure are generally carried out continuously.

EFFECT OF THE INVENTION

In the ethylene/α-olefin/7-methyl-1,6-octadiene copolymer rubber of the invention, a molar ratio of ethylene to α-olefin, a content of 7-methyl-1,6-octadiene, an intrinsic viscosity [η], an intensity ratio D of Tαβ to Tαα in a $^{13}$C-NMR spectrum of the copolymer rubber, a B value defined before and a glass transition temperature Tg are all within specific ranges, and hence this copolymer rubber has high stereoregularity, narrow composition distribution and excellent low-temperature flexibility.

In addition, the ethylene/α-olefin/7-methyl-1,6-octadiene copolymer rubber shows excellent covulcanizability with the conjugated diene rubber.

Further, this copolymer rubber is excellent in various properties such as weathering resistance, ozone resistance and thermal aging resistance.

Moreover, the above-mentioned copolymer rubber is prepared by copolymerizing ethylene, α-olefin and 7-methyl-1,6-octadiene with high activity in the presence of a Group IVB transition metal catalyst comprising a Group IVB transition metal catalyst component containing a ligand having cyclopentadienyl skeleton such as zirconium compound.

Among from various Group IVB transition metal catalysts comprising a Group IVB transition metal catalyst component containing a ligand having cyclopentadienyl skeleton, when a Group IVB transition metal type catalyst formed from a zirconium compound containing a ligand having cyclopentadienyl skeleton and an organoaluminum oxycompound, or a Group IVB transition metal type catalyst formed from this zirconium compound, an organoaluminum oxycompound and an organoaluminum compound, is used in the copolymerization, especially when the latter catalyst is used, the resultant random copolymer rubber is remarkably excellent in the covulcanizability with the conjugated diene rubber.

The ethylene/α-olefin/7-methyl-1,6-octadiene rubber composition of the invention comprises the above-mentioned random copolymer rubber and the conjugated diene rubber. Therefore, the rubber composition maintains excellent mechanical characteristics and oil resistance inherently belonging to the conjugated diene rubber, and can provide a vulcanized rubber which is excellent in low-temperature flexibility, abrasion resistance, fatigue resistance, weathering resistance, ozone resistance and thermal aging resistance.

Accordingly, the rubber composition of the invention is very suitable for automotive parts such as air-containing tire side wall, white side wall, wiper blade and brake piston cup. Particularly, a rubber composition obtained by blending the above-mentioned random copolymer rubber and NBR can provide a vulcanized rubber having good balance between oil resistance, weathering resistance and heat resistance, such good balance having been not observed conventionally. Hence, the rubber composition is very suitable for rubber hose, rubber packing, sealing materials, etc.

The present invention is illustrated below with reference to examples, but it should be construed that the invention is in no way limited to those examples.

Test methods for evaluating EPDM and a vulcanized sheet in the following examples and comparative examples are as follows.

[1] Glass transition temperature

A glass transition temperature Tg of the ethylene/α-olefin/7-methyl-1,6-octadiene copolymer rubber was measured by means of a differential scanning calorimeter (DSC). The glass transition temperature is a measure of low-temperature flexibility of the ethylene/α-olefin/7-methyl1,6-octadiene copolymer rubber.

Temperature cycle in the measurement of To by means of DSC

A temperature of the sample was elevated from room temperature (25° C.) to 180° C. at a rate of 20° C./min and was kept at 180° C. for 2 minutes. Then, the sample was cooled to −80° C. at a rate of -20° C./min and was kept at 80° C. for 2 minutes. Thereafter, the temperature of the sample was again elevated at a rate of 20° C./min to determine Tg of the sample.

[2] Degree of covulcanization

The degree of covulcanization was determined by the following formula.

Degree of covulcanization [%] = $T_B(\text{blend}) \times 100 / [T_B(\text{EPDM}) \times a + T_B(\text{NR}) \times b]$ In the above formula, $T_B(\text{blend})$ is a tensile strength of an actual blend (i.e., rubber composition), $T_B(\text{EPDM})$ is a tensile strength of an ethylene/-propylene/diene rubber (EPDM), $T_B(\text{NR})$ is a tensile strength of a natural rubber, a is a weight fraction of the ethylene/propylene/diene rubber (EPDM), b is a weight fraction of the natural rubber (NR), and a and b have a relation of a+b=1.

[3] Tensile test

A vulcanized rubber sheet was punched to give a dumbbell specimen of No. 3 type described in JIS K 6301 (1989), and the specimen was subjected to a tensile test in accordance with a method defined in Clause 3 of JIS K 6301 under the conditions of a temperature of 25° C. and a tensile rate of 500 mm/min to measure a modulus at 25% ($M_{25}$), a modulus at 50% ($M_{50}$), a modulus at 100% ($M_{100}$), a modulus at 200% ($M_{200}$), a modulus at 300% ($M_{300}$), a tensile strength at brak ($T_B$) and an elongation at break ($E_B$).

[4] Hardness test

The hardness test was carried out in accordance with JIS K 6301 (1989) to measure a spring hardness $H_S$ (JIS A hardness).

[5] Flexural fatigue test

The flexural fatigue test was carried out in accordance with ASTM D 813 using de Mattia machine under the conditions of a rotation number of 300 rpm and a measuring temperature of 40° C., to measure a speed of crack growth (mm/cycle). The speed of crack growth was taken as a measure of dynamic fatigue resistance (durability).

[6] Elongation fatigue test (Monsanto fatigue test)

A vulcanized rubber sheet was punched to give 20 pieces of dumbell specimens of No. 1 type described in JIS K 6301 (1989), and each of the specimens was provided with a notch of 2 mm on the center thereof in the longitudinal direction. Each of 20 pieces of the specimens thus obtained was stretched at an elongation rate of 40%, 80% and 120% at a measuring temperature of 40° C. and a rotation speed of 300 rpm, and an elongation fatigue property was measured to determine the number of dumbbell breaking times. An average value of the number of dumbbell breaking times was taken as a measure of dynamic fatigue resistance (durability).

[7] Ozone resistance test

The ozone resistance test was carried out in accordance with JIS K 6301 under the conditions of an ozone concentration of 50 ppm, a measuring temperature of 40° C. and an elongation rate (static elongation) of 20%, to measure a period of time required for crack occurrence. The crack occurrence time was taken as a measure of ozone resistance or weathering resistance. In this test, the testing period is 10 days.

[8] Low-temperature flexibility

The low-temperature flexibility was evaluated by a glass transition temperature Tg of the ethylene/α-olefin/7-methyl-1,6-octadiene without blending with a natural rubber (NR). The glass transition temperature was measured by means of a differential scanning calorimeter (DSC). Further, a glass transition temperature of the natural rubber itself was also measured.

Temperature cycle in the measurement of Tg by means of DSC

The temperature cycle in this test was the same as that in the aforementioned test [1].

EXAMPLE 1

Copolymerization of ethylene, propylene and 7-methyl-1,6-octadiene was continuously carried out using a 15-liter stainless steel polymerizer (polymerization vessel) equipped with a stirring blade.

That is, to the polymerizer were continuously fed from the top thereof hexane having been dehydrated and purified at a feed rate of 2.0 l/hr, a hexane solution of bis(1,3-dimethylcyclopentadienyl)zirconium dichloride (concentration: 0.05 mmol/l) at a feed rate of 0.2 l/hr, a hexane solution of triisobutylaluminum (concentration: 17 mmol/l) at a feed rate of 0.3 l/hr, a hexane slurry of methylaluminoxane (3 mg.atom/l in terms of aluminum atom) at a feed rate of 1 l/hr and a hexane solution of 7-methyl-1,6-octadiene (concentration: 0.25 l/l) at a feed rate of 1.5 l/hr.

Further, to the polymerizer were continuously fed from the top thereof ethylene at a feed rate of 180 l/hr and propylene at a feed rate of 620 l/hr. This copolymerization reaction was carried out at 50° C.

Subsequently, to the resultant polymer solution drawn out from the bottom of the polymerizer was added a small amount of methanol to stop the copolymerization reaction, and the copolymer solution was subjected to a steam stripping treatment to separate the resultant copolymer from the solvent. The copolymer was then dried at 100° C. for 24 hours under a reduced pressure (100 mmHg).

Through the above operation, an ethylene/propylene/7methyl-1,6-octadiene copolymer was obtained at a rate of 250 g/hr.

The copolymer thus obtained was a rubber, and had a molar ratio of ethylene to propylene (ethylene/propylene) of 70/30, a content of 7-methyl-1,6-octadiene of 1.9% by mol and an intrinsic viscosity $[\eta]$, as measured in decahydronaphthalene at 135° C., of 2.3 dl/g. Further, the intensity ratio D of $T\alpha\beta$ to $T\alpha\alpha$ in the $^{13}$C-NMR spectrum of the copolymer was less than 0.01, the B value was 1.12, and the glass transition temperature was $-61$° C.

EXAMPLES 2-5

The procedure of Example 1 was repeated except for carrying out the copolymerization reaction under the polymerization conditions set forth in Table 1 instead of the polymerization conditions of Example 1, to obtain ethylene/propylene/7-methyl-1,6-octadiene copolymer rubbers [sometimes referred to as "MOD-EPDM (2), MOD-EPDM (3), MODEPDM (4) and MOD-EPDM (5)", respectively, hereinafter].

Properties of the obtained copolymer rubbers are set forth in Table 1.

EXAMPLE 6

Copolymerization of ethylene, propylene and 7-methyl-1,6-octadiene was continuously carried out using a 4-liter polymerizer equipped with a stirring blade.

That is, to the polymerizer were fed from the top thereof a toluene solution of 7-methyl-1,6-octadiene (concentration: 60 g/l) at a feed rate of 1.2 l/hr, a toluene solution of bis(1,3-dimethylcyclopentadienyl)zirconium dichloride (concentration: 0.2 mol/l) as a catalyst at a feed rate of 0.4 l/hr, a toluene solution of methylaluminoxane (concentration: 26.5 mmol/l) at a feed rate of 1.2 l/hr and toluene at a feed rate of 1.2 l/hr, while the resultant copolymer solution was continuously drawn out from the bottom of the polymerizer so that the amount of the copolymer solution in the polymerizer was constantly 2 liters.

Further, to the polymerizer were fed ethylene at a feed rate of 80 l/hr and propylene at a feed rate of 320 l/hr using a bubble tube.

The copolymerization reaction was carried out with keeping the temperature at 40° C. by circulating warm water within a jacket equipped outside of the polymerizer.

Through the copolymerization reaction under the above-mentioned conditions, a copolymer solution containing an ethylene/propylene/7-methyl-1,6 octadiene copolymer was obtained.

Then, the copolymer solution thus obtained was deashed with hydrochloric acid water, and toluene was distilled off from the copolymer solution to give a copolymer. The copolymer was dried at 100° C. for 24 hours under a reduced pressure.

Thus, an ethylene/propylene/7-methyl-1,6-octadiene copolymer was obtained at a rate of 95 g/hr.

The obtained copolymer [sometimes referred to as "MOD-EPDM (6)" hereinafter] was a rubber, and had a molar ratio of ethylene to propylene (ethylene/propylene) of 65/35, a content of 7-methyl-1,6-octadiene of 3.4% by mol and an intrinsic viscosity $[\eta]$, as measured in decahydronaphthalene at 135° C., of 0.3 dl/g. Further, the intensity ratio D of $T\alpha\beta$ to $T\alpha\alpha$ in the $^{13}$C-NMR spectrum of the copolymer was less than 0.01, and the B value was 1.14.

EXAMPLE 7

Preparation of hexane slurry of methylaluminoxane

A glass reactor equipped with a stirring blade was charged with 1 liter of a toluene solution of methylaluminoxane (1.5 g.atom/l in terms of aluminum atom) in an nitrogen atmosphere, and to the toluene solution was dropwise added 1 liter of hexane having been substituted with nitrogen at room temperature over a period of 1 hour under stirring. The resultant solid methylaluminoxane was filtered, then washed with hexane (n-hexane: 60% by volume, methylcyclopentane: 22% by volume, 3-methylpentane: 18% by volume), and dried under a reduced pressure. A part of the resultant product was taken out for the use of analysis, and the residue was suspended in hexane to prepare a hexane slurry of methylaluminoxane.

The methylaluminoxane obtained in the above had a specific surface area of 180 m$^2$/g.

Preparation of copolymer

Copolymerization of ethylene, propylene and 7-methyl-1,6-octadiene was carried out using a 2-liter polymerizer (autoclave) equipped with a stirring blade.

That is, the polymerizer was charged from the top thereof with 0.86 liter of hexane having been dehydrated and purified, 185 ml of propylene, 40 ml of 7-methyl-1,6-octadiene, 0.18 ml of the above-obtained hexane slurry of methylaluminoxane (1.1 mg atom/ml in terms of aluminum atom) and 0.8 ml of a hexane solution of triisobutylaluminum (1 mmol/ml).

Subsequently, the temperature in the polymerizer was elevated to 70° C., and then the polymerizer was charged with ethylene so that the total pressure was 7 kg/cm$^2$.

Thereafter, the polymerizer was charged with 0.44 ml of a hexane solution of bis(1,3-dimethylcyclopentadienyl)zirconium dichloride (concentration: 0.0034 mmol/ml) using a pressure-equalizing tube, and then polymerization was carried out for 1 hour while keeping the temperature at 60° C. and the total pressure at 8 kg/cm$^2$. After release of the pressure, the resultant copolymer solution containing an ethylene/- propylene/7-methyl-1,6-octadiene copolymer was taken out of the polymerizer and dried.

Thus, an ethylene/propylene/7-methyl-1,6-octadiene copolymer was obtained, and the yield of the copolymer was 72.8 g.

The obtained copolymer [sometimes referred to as "MOD-EPDM (7)" hereinafter] was a rubber, and had a molar ratio of ethylene to propylene (ethylene/propylene) of 78/22 (ethylene content: 78% by mol), a content of 7-methyl-1,6-octadiene of 1.8 % by mol (iodine value: 13) and an intrinsic viscosity $[\eta]$, as measured in decahydronaphthalene at 135° C., of 2.6 dl/g. Further, the intensity ratio D of $T\alpha\beta$ to $T\alpha\alpha$ in the $^{13}$C-NMR spectrum of the copolymer was less than 0.01, and the B value was 1.07.

TABLE 1 (I)

| | Hexane [l/hr] | Hexane solution of zirconium compound | | Hexane slurry of methylaluminooxane | | Hexane solution of triisobutylaluminum | | Hexane solution of MOD | |
|---|---|---|---|---|---|---|---|---|---|
| | | [mmol/l] | [l/hr] | [mg-atom/l] | [l/hr] | [mmol/l] | [l/hr] | [l/l] | [l/hr] |
| Ex. 1 | 2.0 | 0.05 | 0.2 | 3 | 1.0 | 17 | 0.3 | 0.25 | 1.5 |
| Ex. 2 | 2.0 | 0.05 | 0.2 | 2 | 1.0 | 17 | 0.3 | 0.43 | 1.5 |
| Ex. 3 | 2.5 | 0.02 | 0.2 | 2 | 0.5 | 17 | 0.3 | 0.47 | 1.5 |
| Ex. 4 | 2.6 | 0.02 | 0.2 | 2 | 0.4 | 17 | 0.3 | 0.47 | 1.5 |
| Ex. 5 | 2.5 | 0.05 | 0.2 | 2 | 0.5 | 17 | 0.3 | 0.43 | 1.5 |

(Note)
zirconium compound: bis(1,3-dimethylcyclopentadienyl)zirconium dichloride
MOD: 7-methyl-1,6-octadiene

TABLE 1 (II)

| | Ethylene [l/hr] | Propylene [l/hr] | Temperature of copolymerization reaction [°C.] | Yield of copolymer rubber [g/hr] |
|---|---|---|---|---|
| Ex. 1 | 180 | 620 | 50 | 250 |
| Ex. 2 | 280 | 520 | 60 | 280 |
| Ex. 3 | 240 | 560 | 50 | 270 |
| Ex. 4 | 230 | 570 | 50 | 240 |
| Ex. 5 | 140 | 560 | 50 | 140 |

TABLE (III)

| | Kind of EPDM | Ethylene/ propylene (molar ratio) | Diene content [mol %] | Intrinsic viscosity $[\eta]$ [dl/g] | $T\alpha\beta/T\alpha\alpha$ (= D) | B value | Glass transition temperature [°C.] |
|---|---|---|---|---|---|---|---|
| Ex. 1 | MOD-EPDM(1) | 70/30 | 1.9 | 2.3 | <0.01 | 1.12 | −61 |
| Ex. 2 | MOD-EPDM(2) | 78/22 | 3.2 | 2.7 | <0.01 | 1.11 | −61 |
| Ex. 3 | MOD-EPDM(3) | 78/22 | 3.4 | 2.9 | <0.01 | 1.09 | −61 |
| Ex. 4 | MOD-EPDM(4) | 78/22 | 3.5 | 3.3 | <0.01 | 1.11 | −61 |
| Ex. 5 | MOD-EPDM(5) | 70/30 | 3.0 | 2.9 | <0.01 | 1.13 | −61 |
| Ex. 6 | MOD-EPDM(6) | 65/35 | 3.4 | 0.3 | <0.01 | 1.14 | — |
| Ex. 7 | MOD-EPDM(7) | 78/22 | 1.8 | 2.6 | <0.01 | 1.07 | — | num sesquichloride [Al(C$_2$H$_5$)$_{1.5}$Cl$_{1.5}$] (concentration 80 mmol/l) at a feed rate of 0.5 l/hr and hexane at a feed rate of 0.5 l/hr, while the resultant copolymer solution was continuously drawn out from the bottom of the polymerizer so that the amount of the copolymer solution in the polymerizer was constantly 1 liter Further, to the polymerizer were fed ethylene at a feed rate of 120 l/hr, propylene at a feed rate of 180 l/hr and hydrogen at a feed rate of 15 l/hr using a bubble tube.

The copolymerization reaction was carried out with keeping the temperature at 30 ° C by circulating a refrigerant within a jacket equipped outside of the polymerizer.

Through the copolymerization reaction under the above-mentioned conditions, a copolymer solution containing an ethylene/propylene/5-ethylidene-2-norbornene copolymer was obtained.

Then, the copolymer solution thus obtained was deashed with hydrochloric acid water, and a large amount of methanol was added to the copolymer solution to precipitate a copolymer Then, the copolymer was dried at 100° C. for 24 hours under a reduced pressure.

Thus, an ethylene/propylene/5-ethylidene-2-norbornene copolymer was obtained at a rate of 64.8 g/hr

COMPARATIVE EXAMPLE 1

Copolymerization of ethylene, propylene and 5-ethylidene-2-norbornene (ENB) was continuously carried out using a 2-liter polymerizer equipped with a stirring blade.

That is, to the polymerizer were fed from the top thereof a hexane solution of ENB (concentration 7.1 g/l) at a feed rate of 0.5 l/hr, a hexane solution of VO-(OC$_2$H$_5$)Cl$_2$ (concentration 0 8 mmol/1) as a catalyst at a feed rate of 0.5 l/hr, a hexane solution of ethylalumi- The obtained copolymer [sometimes referred to as "ENB-EPDM (1)" hereinafter]was a rubber, and had a molar ratio of ethylene to propylene (ethylene/propylene) of 68/32, a content of ENB of 1.8 % by mol and an intrinsic viscosity $[\eta]$, as measured in decahydronaphthalene at 135° C., of 2.2 dl/g. Further, the intensity ratio D of $T\alpha\beta$ to $T\alpha\alpha$ in the $^{13}$C-NMR spectrum of the copolymer was 1 4.

COMPARATIVE EXAMPLES 2&3

The procedure of Comparative Example 1 was repeated except for carrying out the copolymerization reaction under the polymerization conditions set forth in Table 2 instead of the polymerization conditions of Comparative Example 1, to obtain ethylene/propylene/5-ethylidene-2-norbornene copolymer rubbers [sometimes referred to as "ENB-EPDM (2) and ENB-EPDM (3)", respectively, hereinafter].

Properties of the obtained copolymer rubbers are set forth in Table 2.

COMPARATIVE EXAMPLE 4

Copolymerization of ethylene with propylene and 7-methyl-1,6-octadiene was continuously carried out using a 2-lite polymerizer equipped with a stirring blade.

That is, to the polymerizer were fed from the top thereof a hexane solution of 7-methyl-1,6-octadiene (concentration: 36 g/l) at a feed rate of 0.5 l/hr, a hexane solution of $VO(OC_2H_5)Cl_2$ (concentration: 8 mmol/l) as a catalyst at a feed rate of 0.5 l/hr, a hexane solution of ethylaluminum sesquichloride [$Al(C_2H_5)_{1.5}Cl_{1.5}$] (concentration: 64 mmol/l) at a feed rate of 0.5 l/hr and hexane at a feed rate of 0.5 l/hr, while the resultant polymer solution was continuously drawn out from the bottom of the polymerizer so that the amount of the polymer solution in the polymerizer was constantly 1 liter.

Further, to the polymerizer were fed ethylene at a feed rate of 130 l/hr, propylene at a feed rate of 170 l/hr and hydrogen at a feed rate of 40 l/hr using a bubble tube.

The copolymerization reaction was carried out with keeping the temperature at 20 ° C by circulating a refrigerant within a jacket equipped outside of the polymerizer.

Through the copolymerization reaction under the above-mentioned conditions, a copolymer solution containing an ethylene/propylene/7-methyl-1,6-octadiene copolymer was obtained.

Then, the copolymer solution thus obtained was deashed with hydrochloric acid water, and a large amount of methanol was added to the copolymer solution to precipitate a copolymer. Then, the copolymer was dried at 100° C. for 24 hours under a reduced pressure.

Thus, an ethylene/propylene/7-methyl-1,6-octadiene copolymer was obtained at a rate of 47 g/hr.

The obtained copolymer [sometimes referred to as "MODEPDM (8)" hereinafter] was a rubber, and had a molar ratio of ethylene to propylene (ethylene/propylene) of 67/33, a content of 7-methyl-1,6-octadiene of 3.5 % by mol and an intrinsic viscosity [$\eta$], as measured in decahydronaphthalene at 135° C., of 0.3 dl/g. Further, the intensity ratio D of $T\alpha\beta$ to $T\alpha\alpha$ in the $^{13}C$-NMR spectrum of the copolymer was 1.43.

TABLE 2 (I)

|  | Hexane | Hexane solution of $V(OC_2H_5)Cl_2$ | | Hexane solution of ethylaluminum sesquichloride | | Hexane solution of ENB | |
|---|---|---|---|---|---|---|---|
|  | [l/hr] | [mmol/l] | [l/hr] | [mmol/l] | [l/hr] | [g/l] | [l/hr] |
| Comp. Ex. 1 | 0.5 | 0.8 | 0.5 | 8.0 | 0.5 | 7.1 | 0.5 |
| Comp. Ex. 2 | 0.5 | 0.8 | 0.5 | 8.0 | 0.5 | 10.0 | 0.5 |
| Comp. Ex. 3 | 0.5 | 0.8 | 0.5 | 8.0 | 0.5 | 10.0 | 0.5 |

TABLE 2 (II)

|  | Ethylene [l/hr] | Propylene [l/hr] | Hydrogen [l/hr] | Temperature of copolymerization reaction (°C.) | Yield of copolymer rubber [g/hr] |
|---|---|---|---|---|---|
| Comp. Ex. 1 | 120 | 180 | 15 | 30 | 64.8 |
| Comp. Ex. 2 | 145 | 155 | 5 | 30 | 56.8 |
| Comp. Ex. 3 | 145 | 155 | 5 | 30 | 52.2 |

TABLE 2 (III)

|  | Kind of EPDM | Ethylene/propylene (molar ratio) | Diene content [mol %] | Intrinsic viscosity [$\eta$] [dl/g] | $T\alpha\beta/T\alpha\alpha$ (= D) | Glass transition temperature [°C.] |
|---|---|---|---|---|---|---|
| Comp. Ex. 1 | ENB-EPDM(1) | 68/32 | 1.8 | 2.2 | 1.4 | −51 |
| Comp. Ex. 2 | ENB-EPDM(2) | 78/22 | 2.9 | 3.9 | 1.4 | −49 |
| Comp. Ex. 3 | ENB-EPDM(3) | 78/22 | 2.9 | 3.8 | 1.4 | −49 |
| Comp. Ex. 4 | MOD-EPDM(8) | 67/33 | 3.5 | 0.3 | 1.43 | — |

COMPARATIVE EXAMPLE 5

100 parts by weight of a natural rubber (NR) [RSS No. 1], 5 parts by weight of zinc white, 1 part by weight of stearic acid, 40 parts by weight of carbon black [Asahi 60HG, available from Asahi Carbon K.K.]and 20 parts by weight of oil [Sunsen 4240, available from Nippon Sun Oil K.K.] were kneaded with each other in a 4.3-liter Banbury mixer [produced by Kobe Seikosho K.K.]. Prior to the above kneading, the natural rubber was roughly milled using 8-inch milling rolls (temperature of front roll and back roll: 65° C).

To the kneadate obtained as above were added 1.5 parts by weight of sulfur and 1.0 part by weight of a vulcanization accelerator [Nocseller CZ, available from Ouchi Shinko Kagaku Kogyo K.K.]. The resultant mixture was milled by rolls and then rolled into a sheet. The sheet was pressed under the condition of 150° C.×t$_{90}$(minutes), this condition being determined based on t$_{90}$ (minutes) at 150° C. using a 3-type curastometer [produced by Japan Synthetic Rubber Co., Ltd.], to prepare a vulcanized sheet having a thickness of 2 mm.

The vulcanized sheet thus obtained was subjected to physical property tests in accordance with the aforementioned test methods.

The results are set forth in Table 3 and Table 4.

The results are set forth in Table 3.

EXAMPLE 10

The procedure of Comparative Example 5 was repeated except for varying the amount of the natural rubber to 70 parts by weight and further using 30 parts by weight of MOD-EPDM (3) of Example 3.

The results are set forth in Table 3.

EXAMPLE 11

The procedure of Comparative Example 5 was repeated except for varying the amount of the natural rubber to 70 parts by weight and further using 30 parts by weight of MOD-EPDM (4) of Example 4.

The results are set forth in Table 3.

TABLE 3

|  | Comp. Ex. 5 | Comp. Ex. 6 | Comp. Ex. 7 | Ex. 8 | Ex. 9 | Ex. 10 | Ex. 11 |
| --- | --- | --- | --- | --- | --- | --- | --- |
| Kind of EPDM | — | ENB-EPDM | ENB-EPDM | MOD-EPDM | MOD-EPDM | MOD-EPDM | MOD-EPDM |
| NR/EPDM (weight ratio) | 100/0 | 70/30 | 70/30 | 70/30 | 70/30 | 70/30 | 70/30 |
|  |  | Comp. Ex. 1 | Comp. Ex. 2 | Ex. 1 | Ex. 2 | Ex. 3 | Ex. 4 |
| Physical properties of vulcanized rubber |  |  |  |  |  |  |  |
| M$_{25}$ [kg/cm$^2$] | 4 | 5 | 6 | 6 | 5 | 5 | 6 |
| M$_{50}$ [kg/cm$^2$] | 6 | 8 | 9 | 9 | 8 | 8 | 8 |
| M$_{100}$ [kg/cm$^2$] | 10 | 14 | 16 | 16 | 14 | 15 | 15 |
| M$_{200}$ [kg/cm$^2$] | 27 | 33 | 37 | 38 | 35 | 36 | 37 |
| M$_{300}$ [kg/cm$^2$] | 57 | 58 | 65 | 70 | 64 | 66 | 70 |
| T$_B$ [kg/cm$^2$] | 217 | 123 | 190 | 168 | 190 | 200 | 220 |
| E$_B$ [%] | 640 | 530 | 600 | 580 | 590 | 590 | 580 |
| H$_S$ (JIS A) | 40 | 49 | 51 | 51 | 50 | 50 | 51 |
| Elongation fatigue test |  |  |  |  |  |  |  |
| Elongation rate 40% [number of times] | 76,770 | 64,570 | 135,330 | 132,120 | 242,440 | 266,240 | 315,172 |
| Elongation rate 80% [number of times] | 20,000 | 12,000 | 26,260 | 25,160 | 33,610 | 36,971 | 43,693 |
| Elongation rate 120% [number of times] | 7,420 | 2,150 | 6,190 | 6,201 | 9,320 | 10,252 | 12,116 |
| Degree of covulcanization [%] | — | 64 | 84 | 91 | 94 | 96 | 97 |

(Note)
END-EPDM is prepared using a Group VB transition metal catalyst containing a vanadium catalyst component.
MOD-EPDM is prepared using a Group IVB transition metal catalyst containing a zirconium catalyst component.

COMPARATIVE EXAMPLE 6

The procedure of Comparative Example 5 was repeated except for varying the amount of the natural rubber to 70 parts by weight and further using 30 parts by weight of ENB-EPDM (1) of Comparative Example 1.

The results are set forth in Table 3.

COMPARATIVE EXAMPLE 7

The procedure of Comparative Example 5 was repeated except for varying the amount of the natural rubber to 70 parts by weight and further using 30 parts by weight of ENB-EPDM (2) of Comparative Example 2.

The results are set forth in Table 3.

EXAMPLE 8

The procedure of Comparative Example 5 was repeated except for varying the amount of the natural rubber to 70 parts by weight and further using 30 parts by weight of MOD-EPDM (1) of Example 1.

The results are set forth in Table 3.

EXAMPLE 9

The procedure of Comparative Example 5 was repeated except for varying the amount of the natural rubber to 70 parts by weight and further using 30 parts by weight of MOD-EPDM (2) of Example 2.

From the results set forth in Table 3, followings have been confirmed.

The MOD-EPDM prepared using a Group IVB transition metal catalyst comprising a zirconium catalyst component, which was used in Examples 8 to 11, is much more improved in the degree of covulcanization with NR and is excellent in the covulcanizability therewith, as compared with the ENB-EPDM prepared using a Group VB transition metal catalyst comprising a vanadium catalyst component, which was used in Comparative Examples 6 and 7.

Further, the raw rubber (MOD-EPDM) in Examples 9 to 11 is more improved in the low-temperature flexibility by about 10° C. than the raw rubber (ENB-EPDM) in Comparative Examples 6 and 7.

In comparison of Examples 8 to 11 with Comparative Examples 6 and 7, the ENB-EPDM is deteriorated in the low-temperature flexibility when a diene content is increased in order to make the vulcanization speed higher, while the MOD-EPDM is hardly deteriorated in the low-temperature flexibility even when a diene content is increased.

Since the EPDM used in Examples 8 to 11 is enhanced in the covulcanizability with NR, it is also enhanced in the dynamic fatigue resistance and has physical property values of higher level than the NR in Comparative Example 5.

COMPARATIVE EXAMPLE 8

The procedure of Comparative Example 5 was repeated except for varying the amount of the natural rubber to 80 parts by weight and further using 20 parts by weight of ENB-EPDM (3) of Comparative Example 3.

The results are set forth in Table 4.

COMPARATIVE EXAMPLE 9

The procedure of Comparative Example 5 was repeated except for varying the amount of the natural rubber to 75 parts by weight and further using 25 parts by weight of ENB-EPDM (3) of Comparative Example 3.

The results are set forth in Table 4.

COMPARATIVE EXAMPLE 10

The procedure of Comparative Example 5 was repeated except for varying the amount of the natural rubber to 70 parts by weight and further using 30 parts by weight of ENB-EPDM (3) of Comparative Example 3.

The results are set forth in Table 4.

COMPARATIVE EXAMPLE 11

The procedure of Comparative Example 5 was repeated except for varying the amount of the natural rubber to 65 parts by weight and further using 35 parts by weight of ENB-EPDM (3) of Comparative Example 3.

The results are set forth in Table 4.

EXAMPLE 12

The procedure of Comparative Example 5 was repeated except for varying the amount of the natural rubber to 80 parts by weight and further using 20 parts by weight of MOD-EPDM (5) of Example 5.

The results are set forth in Table 4.

EXAMPLE 13

The procedure of Comparative Example 5 was repeated except for varying the amount of the natural rubber to 75 parts by weight and further using 25 parts by weight of MOD-EPDM (5) of Example 5.

The results are set forth in Table 4.

EXAMPLE 14

The procedure of Comparative Example 5 was repeated except for varying the amount of the natural rubber to 70 parts by weight and further using 30 parts by weight of MOD-EPDM (5) of Example 5.

The results are set forth in Table 4.

EXAMPLE 15

The procedure of Comparative Example 5 was repeated except for varying the amount of the natural rubber to 65 parts by weight and further using 35 parts by weight of MOD-EPDM (5) of Example 5.

The results are set forth in Table 4.

EXAMPLE 16

The procedure of Comparative Example 5 was repeated except for varying the amount of the natural rubber to 80 parts by weight and further using 20 parts by weight of MOD-EPDM (6) of Example 6.

The results are set forth in Table 4.

COMPARATIVE EXAMPLE 12

The procedure of Comparative Example 5 was repeated except for varying the amount of the natural rubber to 80 parts by weight and further using 20 parts by weight of MOD-EPDM (8) of Comparative Example 4.

The results are set forth in Table 4.

TABLE 4 (I)

| | Comp. Ex. 5 | Comp. Ex. 8 | Comp. Ex. 9 | Comp. Ex. 10 | Comp. Ex. 11 |
|---|---|---|---|---|---|
| Kind of EPDM | — | ENB-EPDM Comp. Ex. 3 | ENB-EPDM Comp. Ex. 3 | ENB-EPDM Comp. Ex. 3 | ENB-EPDM Comp. Ex. 3 |
| NR/EPDM (weight ratio) | 100/0 | 80/20 | 75/25 | 70/30 | 65/35 |
| Physical properties of vulcanized rubber | | | | | |
| $M_{25}$ [kg/cm$^2$] | 4 | 6 | 7 | 7 | 7 |
| $M_{50}$ [kg/cm$^2$] | 6 | 9 | 11 | 11 | 11 |
| $M_{100}$ [kg/cm$^2$] | 10 | 17 | 19 | 20 | 20 |
| $M_{200}$ [kg/cm$^2$] | 27 | 41 | 44 | 46 | 44 |
| $M_{300}$ [kg/cm$^2$] | 57 | 75 | 76 | 78 | 75 |
| $T_B$ [kg/cm$^2$] | 217 | 190 | 185 | 180 | 175 |
| $E_B$ [%] | 640 | 590 | 600 | 590 | 590 |
| $H_S$ (JIS A) | 40 | 50 | 52 | 54 | 55 |
| Flexural fatigue test crack growth speed [× 10$^{-4}$ mm/cycle] | 4.1 | 3.8 | 2.9 | 2.2 | 2.0 |
| Ozone resistance test crack occurrence time [hrs] | 16 | 24 | 28 | No crack | No crack |

(Note)
ENB-EPDM of Comparative Example 3 and MOD-EPDM of Comparative Example 4 are prepared using a Group VB transition metal catalyst containing a vanadium catalyst component.
MOD-EPDM of Examples 5 and 6 is prepared using a Group IVB transition metal catalyst containing a zirconium catalyst component.

TABLE 4 (II)

| | Ex. 12 | Ex. 13 | Ex. 14 | Ex. 15 | Ex. 16 | Comp. Ex. 12 |
|---|---|---|---|---|---|---|
| Kind of EPDM | MOD-EPDM Ex. 5 | MOD-EPDM Ex. 5 | MOD-EPDM Ex. 5 | MOD-EPDM Ex. 5 | MOD-EPDM Ex. 6 | MOD-EPDM Comp. Ex. 4 |
| NR/EPDM (weight ratio) | 80/20 | 75/25 | 70/30 | 65/35 | 80/20 | 80/20 |
| Physical properties of vulcanized rubber | | | | | | |
| $M_{25}$ [kg/cm$^2$] | 6 | 6 | 6 | 6 | 4 | 4 |
| $M_{50}$ [kg/cm$^2$] | 9 | 9 | 10 | 11 | 7 | 7 |
| $M_{100}$ [kg/cm$^2$] | 16 | 17 | 17 | 18 | 13 | 13 |
| $M_{200}$ [kg/cm$^2$] | 41 | 41 | 42 | 43 | 30 | 29 |
| $M_{300}$ [kg/cm$^2$] | 76 | 75 | 75 | 78 | 55 | 54 |
| $T_B$ [kg/cm$^2$] | 186 | 180 | 170 | 168 | 120 | 115 |
| $E_B$ [%] | 570 | 570 | 560 | 540 | 600 | 600 |
| $H_S$ (JIS A) | 50 | 51 | 52 | 53 | 38 | 38 |
| Flexural fatigue test crack growth speed [× 10$^{-4}$ mm/cycle] | 2.5 | 1.1 | 1.0 | 0.09 | — | — |
| Ozone resistance test crack occurrence | 24 | No crack | No crack | No crack | No crack | 48 |

TABLE 4 (II)-continued

|  | Ex. 12 | Ex. 13 | Ex. 14 | Ex. 15 | Ex. 16 | Comp. Ex. 12 |
|---|---|---|---|---|---|---|
| time [hrs] | | | | | | |

(Note)
ENB-EPDM of Comparative Example 3 and MOD-EPDM of Comparative Example 4 are prepared using a Group VB transition metal catalyst containing a vanadium catalyst component.
MOD-EPDM of Examples 5 and 6 is prepared using a Group IVB transition metal catalyst containing a zirconium catalyst component.

From the results set forth in Table 4, followings have been confirmed.

In comparison of Examples 12 to 15 with Comparative Examples 8 to 11, in each example the same blending ratio between rubbers is used, the vulcanized rubber of Examples 12 to 15 prepared using MOD-EPDM is better in the crack growth resistance by about 2 times than the vulcanized rubber of Comparative Examples 8 to 11. This means that the MOD-EPDM used in Examples 12 to 15 is excellent in the covulcanizability with NR.

The above-mentioned excellent covulcanizability of MOD-EPDM with NR influences on the ozone resistance. Specifically, in Comparative Examples 8 to 11, the effect of inhibiting crack occurrence appears from when ENB-EPDM is used in an amount of 30 parts by weight based on 100 parts by weight of the total amount of NR and ENB-EPDM, while in Examples 12 to 15, the effect appears from when MOD-EPDM is used in an amount of 25 parts by weight based on 100 parts by weight of the total amount of NR and MOD-EPDM, and the crack occurrence can be perfectly inhibited. That is, it is good enough to use the MOD-EPDM in a smaller amount than the ENB-EPDM.

In Example 16, the vulcanized sheet prepared using a liquid MOD-EPDM was evaluated on the ozone resistance. Even if the MOD-EPDM is liquid, the crack occurrence of NR caused by ozone can be inhibited when the content of the liquid MOD-EPDM is not smaller than 20 parts by weight based on 100 parts by weight of the total amount of NR and MOD-EPDM.

In comparison of Example 16 with Comparative Example 12, the copolymer of Example 16 prepared using a Group IVB transition metal catalyst comprising a zirconium catalyst component is better in the covulcanizability with the conjugated diene rubber than the copolymer of Comparative Example 12 prepared using a Group VB transition metal catalyst comprising a vanadium catalyst component, and hence the copolymer of Example 16 is excellent in the ozone resistance and the tensile strength ($T_B$). The reason why the copolymer of Example 16 is excellent in the covulcanizability with the conjugated diene rubber is assumed to be that the copolymer comes to have double bond at the terminal of the molecule by using the Group IvB transition metal catalyst comprising a zirconium catalyst component.

What is claimed is:

1. An ethylene /α-olefin/7-methyl-1,6-octadiene copolymer rubber, said copolymer rubber being a random copolymer rubber of ethylene, α-olefin and 7-methyl-1,6-octadiene copolymer, wherein the ethylene/α-olefin/7-methyl-1,6-octadiene copolymer rubber comprises
   (i) a molar ratio of ethylene to α-olefin (ethylene/α-olefin) in the range of 40/60 to 90/10;
   (ii) a content of 7-methyl-1,6-octadiene in the range of 0.4 to 25% by mol;
   (iii) an intrinsic viscosity ($\eta$) as measured in decahydronaphthalene at 135° C., from 0.1 dl/g to 8 dl/g;
   (iv) an intensity ratio D of $T\alpha\beta$ to $T\alpha\alpha (T\alpha\beta/T\alpha\alpha)$ in a $^{13}$C-NMR spectrum of said copolymer rubber not more than 0.5;
   (v) a B value determined by a $^{13}$C-NMR spectrum of said copolymer rubber and the following formula in the range of 1.00 to 1.50

$$B = P_{OE} / (wP_E \cdot P_O)$$

wherein $P_E$ is a molar fraction of the ethylene units derived from ethylene; $P_O$ is a molar fraction of the α-olefin units derived from α-olefin; and $P_{OE}$ is a ratio of the number of α-olefin/ethylene chains to the number of all dyad chains in the random copolymer rubber; and
   (vi) a glass transition temperature Tg measured by DSC not higher than −53° C.

2. An ethylene/α-olefin/7-methyl-1,6-octadiene copolymer rubber, said copolymer rubber being a random copolymer rubber of ethylene, α-olefin and 7-methyl-1,6-octadiene copolymer and obtained by copolymerizing ethylene, α-olefin and 7-methyl-1,6-octadiene in the presence of a Group IVB transition metal catalyst comprising (a) a Group IVB transition metal compound containing a ligand having cyclopentadienyl skeleton and (b) an organoaluminum oxycompound, wherein the ethylene/αolefin/7-methyl-1,6-octadiene copolymer rubber comprises
   (i) a molar ratio of ethylene to α-olefin (ethylene/α-olefin) in the range of 40/60 to 90/10;
   (ii) a content of 7-methyl-1,6-octadiene copolymer in the range of 0.4 to 25% by mol;
   (iii) an intrnsic viscosity ($\eta$) as measured in decahydronaphthalene at 135° C., from 0.1 dl/g to 8 dl/g;
   (iv) an intensity ratio D of $T\alpha\beta$ to $T\alpha\alpha (T\alpha\beta/T\alpha\alpha)$ in a $^{13}$C-NMR spectrum of said copolymer rubber not more than 0.5;
   (v) a B value determined by a $^{13}$C-NMR spectrum of said copolymer rubber and the following formula in the range of 1.00 to 1.5

$$B = P_{OE} / (2P_E \cdot P_O)$$

wherein $P_E$ is a molar fraction of the ethylene units derived from ethylene; $P_O$ is a molar fraction of the α-olefin units derived from α-olefin; and $P_{OE}$ is a ratio of the number of α-olefin/ethylene chains to the number of all dyad chains in the random copolymer rubber; and
   (vi) a glass transition temperature Tg measured by DSC not higher than −53° C.

3. The ethylene/α-olefin/7-methyl-1,6-octadiene copolymer rubber as claimed in claim 2, wherein the Group IVB transition metal compound (a) is a zirconium compound containing a ligand having cyclopentadienyl skeleton.

4. The ethylene/α-olefin/7-methyl-1,6-octadiene copolymer rubber as claimed in claim 2, wherein the Group IVB transition metal catalyst comprises a zirconium compound containing a ligand having cyclopentadienyl skeleton, the organoaluminum oxycompound (b) and an organoaluminum compound (c).

5. An ethylene/α-olefin/7-methyl-1,6-octadiene copolymer rubber composition comprising a random copolymer rubber of ethylene, α-olefin and 7-methyl-1,6-octadiene and a conjugated diene rubber, wherein the ethylene/α-olefin/7-methyl-1,6-octadiene copolymer rubber comprises (i) a molar ratio of ethylene to α-olefin (ethylene/α-olefin) in the random copolymer rubber in the range of 40/60 to 90/10;

(ii) a content of 7-methyl-1,6-octadiene in the random copolymer rubber in the range of 0.4 to 25% by mol;

(iii) an intrinsic viscosity (η) of the random copolymer rubber, as measured in decahydronaphthalene from 0.1 dl/g to 8 dl/g;

(iv) an intensity ratio D of Tαβ to Tαα (Tα/β/Tαα) in a $^{13}$C-NMR spectrum of the random copolymer rubber not more than 0.5;

(v) a B value determined by a $^{13}$C-NMR spectrum of the random copolymer rubber and the following formula in the range of 1.00 to 1.50

$$B = P_{OE}/(2P_E \cdot P_O)$$

wherein $P_E$ is a molar fraction of the ethylene units derived from ethylene; $P_O$ is a molar fraction of the α-olefin units derived from α-olefin; and $P_{OE}$ is a ratio of the number of α-olefin/ethylene chains to the number of all dyad chains in the random copolymer rubber; and (vi) a glass transition temperature Tg of the random copolymer rubber measured by DSC not higher than −53° C.

6. The ethylene/α-olefin/7-methyl-1,6-octadiene copolymer rubber composition as claimed in claim 5, wherein the content of the random copolymer rubber is in the range of 5 to 95 parts by weight and the content of the conjugated diene rubber is in the range of 5 to 95 parts by weight, the total amount of both rubbers being 100 parts by weight.

7. An ethylene/α-olefin/7-methyl-1,6-octadiene copolymer rubber composition comprising a random copolymer rubber and a conjugated diene rubber, said random copolymer rubber being obtained by copolymerizing ethylene, α-olefin and 7-methyl-1,6-octadiene in the presence of a Group IVB transition metal catalyst comprising (a) a Group IVB transition metal compound containing a ligand having cyclopentadienyl skeleton and (b) an organoaluminum oxycompound, wherein the ethylene/α-olefin/7-methyl-1,6-octadiene copolymer rubber comprises (i) a molar ratio of ethylene to α-olefin (ethylene/α-olefin) in the random copolymer rubber in the range of 40/60 to 90/10;

(ii) a content of 7-methyl-1,6-octadiene in the random copolymer rubber in the range of 0.4 to 25% by mol;

(iii) an intrinsic viscosity (η) of the random copolymer rubber, as measured in decahydronaphthalene at 135° C., from 0.1 dl/g to 8 dl/g;

(iv) an intensity ratio D of Tαβ to Tαα (Tαβ/Tαα) in a $^{13}$C-NMR spectrum of the random copolymer rubber not more than 0.5;

(v) a B value determined by a $^{13}$C-NMR spectrum of the random copolymer rubber and the following formula in the range of 1.00 to 1.50

$$B = P_{OE}/(2P_E \cdot P_O)$$

wherein $P_E$ is a molar fraction of the ethylene units derived from ethylene; $P_O$ is a molar fraction of the α-olefin units derived from α-olefin; and $P_{OE}$ is a ratio of the number of α-olefin/ethylene chains to the number of all dyad chains in the random copolymer rubber; and (vi) a glass transition temperature Tg of the random copolymer rubber measured by DSC not higher than −53° C.

8. The ethylene/α-olefin/7-methyl-1,6-octadiene copolymer rubber composition as claimed in claim 7, wherein the Group IVB transition metal compound (a) is a zirconium compound containing a ligand having cyclopentadienyl skeleton.

9. The ethylene/α-olefin/7-methyl-1,6-octadiene copolymer rubber composition as claimed in claim 7, wherein the Group IVB transition metal catalyst comprises a zirconium compound containing a ligand having cyclopentadienyl skeleton (a), the organoaluminum oxycompound (b) and an organoaluminum compound (c).

10. The ethylene/α-olefin/7-methyl-1,6-octadiene copolymer rubber composition as claimed in claim 7 or claim 8 wherein the content of the random copolymer rubber is in the range of 5 to 95 parts by weight and the content of the conjugated diene rubber is in the range of 5 to 95 parts by washed with water and ethanol successively, followed by the addition of 300 ml of ethanol and 2 ml of concentrated sulfuric acid. The obtained mixture was refluxed for about 5 hours and distilled under a reduced pressure to remove the ethanol. Water was added to the obtained residue. The obtained mixture was made alkaline with a dilute aqueous solution of sodium hydroxide and extracted with ethyl acetate. The ethyl acetate phase was washed with water, dried over magnesium sulfate and purified by silica gel column chromatography (solvent: hexane/ethyl acetate) to obtain 2.75 g of ethyl ester of the title compound.

NMR (CDCl$_3$)δ;
1.28(3H, t, J=8Hz), 3.26(2H, d, J=6Hz),
4.2(2H, q, J=8Hz), 5.8~6.7(2H, m), 7.3~7.5(4H,m),
7.74(1H,d,J=1Hz), 8.04(1H, d,J=1Hz)

2.7 g of the above ester was dissolved in 50 ml of methanol, followed by the addition of 14 ml of 1N sodium hydroxide. The obtained mixture was stirred at 30 to 40° C. for about 2 hours and distilled under a reduced pressure to remove the methanol. The residue was neutralized with 1n hydrochloric acid to precipitate a solid. This solid was recovered by weight, the total amount of both rubbers being 100 parts by weight.

11. The ethylene/α-olefin/7-methyl-1,6-octadiene copolymer rubber of claim 1, 2, 5, or 7 wherein said α-olefin is a member selected from the group consisting of α-olefins having 3 to 6 carbon atoms.

12. The ethylene/α-olefin/7-methyl-1,6-octadiene copolymer rubber of claim 1,2,5 or 7 wherein said α-olefin is propylene.

* * * * *